US011984669B2

(12) United States Patent
Huang et al.

(10) Patent No.: US 11,984,669 B2
(45) Date of Patent: May 14, 2024

(54) ANTENNA MODULE

(71) Applicant: PEGATRON CORPORATION, Taipei (TW)

(72) Inventors: Chin-Ting Huang, Taipei (TW); Chun-Kai Wang, Taipei (TW); Hsi-Kai Hung, Taipei (TW); Sony Chayadi, Taipei (TW)

(73) Assignee: PEGATRON CORPORATION, Taipei (TW)

(*) Notice: Subject to any disclaimer, the term of this patent is extended or adjusted under 35 U.S.C. 154(b) by 24 days.

(21) Appl. No.: 17/862,216

(22) Filed: Jul. 11, 2022

(65) Prior Publication Data

US 2023/0057270 A1 Feb. 23, 2023

(30) Foreign Application Priority Data

Aug. 19, 2021 (TW) ................................ 110130731

(51) Int. Cl.
*H01Q 1/22* (2006.01)
*H01Q 9/04* (2006.01)

(52) U.S. Cl.
CPC ......... *H01Q 9/0414* (2013.01); *H01Q 1/2291* (2013.01); *H01Q 9/0421* (2013.01)

(58) Field of Classification Search
CPC .. H01Q 9/0414; H01Q 1/2291; H01Q 9/0421; H01Q 1/2208; H01Q 5/307; H01Q 9/42; H01Q 1/38; H01Q 21/28
See application file for complete search history.

(56) References Cited

U.S. PATENT DOCUMENTS 6,700,540 B2 3/2004 Holshouser
7,027,838 B2 4/2006 Zhou et al.
10,084,241 B1 * 9/2018 Jenwatanavet .......... H01Q 1/48
2005/0140554 A1 * 6/2005 Wang .................. H01Q 9/0442 343/702
2010/0214179 A1 * 8/2010 Wong ...................... H01Q 1/38 343/702
2011/0260939 A1 * 10/2011 Korva ..................... H01Q 9/42 343/725
2013/0044036 A1 * 2/2013 Kuonanoja ............ H01Q 5/371 343/893
2014/0368405 A1 * 12/2014 Ek .......................... H01Q 5/371 343/893

FOREIGN PATENT DOCUMENTS

CN 112151960 12/2020
TW I411159 10/2013

* cited by examiner

*Primary Examiner* — Hai V Tran
*Assistant Examiner* — Michael M Bouizza
(74) *Attorney, Agent, or Firm* — J.C. PATENTS

(57) ABSTRACT

Provided is an antenna module including a first planar inverted-F antenna radiator, a first ground plane, a second ground plane, and a conductor. The first planar inverted-F antenna radiator includes a first feeding terminal and a first ground terminal. The first ground terminal is connected to the first ground plane. The second ground plane is located on one side of the first ground plane. A gap exists between the first ground plane and the second ground plane. The conductor is located between the first ground plane and the second ground plane and connects the first ground plane with the second ground plane.

9 Claims, 6 Drawing Sheets

ANTENNA MODULE

CROSS-REFERENCE TO RELATED APPLICATION

This application claims the priority benefit of Taiwan application Ser. No. 110130731, filed on Aug. 19, 2021. The entirety of the above-mentioned patent application is hereby incorporated by reference herein and made a part of this specification.

BACKGROUND

Technology Field

The present disclosure relates to an antenna module, particularly to an antenna module applicable to small-sized devices.

Description of Related Art

The ultra-high frequency (UHF) radio-frequency identification (RFID) currently operates in ranges of from 865 to 868 MHz (in Europe), from 902 to 928 MHz (in North America), and from 922 to 928 MHz (in Taiwan). The current RFID antennas mainly adopt circular polarization ceramic antennas as it has good vertical and horizontal polarization and can receive RFID signals from different polarizations.

However, the size of a circular polarization ceramic antenna is too big to be disposed in a small device. In addition, the material of the circular polarization ceramic antennas is brittle and easy to crack when the device is dropped, so it is not suitable to be used in handheld or wearable communication products.

SUMMARY

The disclosure provides an antenna module applicable to small-sized devices.

An antenna module of the disclosure includes a first planar inverted-F antenna radiator, a first ground plane, a second ground plane, and a conductor. The first planar inverted-F antenna radiator includes a first feeding terminal and a first ground terminal. The first ground terminal is connected to the first ground plane. The second ground plane is located on one side of the first ground plane. A gap exists between the first ground plane and the second ground plane. The conductor is located between the first ground plane and the second ground plane and connects the first ground plane with the second ground plane.

In an embodiment of the disclosure, the projection of the second ground plane onto the plane where the first ground plane is overlaps with at least part of the first ground plane, and the conductor is located in the gap.

In an embodiment of the disclosure, the projection of the conductor onto the plane where the first ground plane is and the projection of the first planar inverted-F antenna radiator onto the plane where the first ground plane is are close to two sides of the first ground plane.

In an embodiment of the disclosure, the projections of the conductor and the first ground terminal onto the first ground plane are close to two diagonal corners of the first ground plane.

In an embodiment of the disclosure, the projections of the conductor and the first ground terminal onto the first ground plane are close to two adjacent corners of the first ground plane.

In an embodiment of the disclosure, the first ‘planar inverted-F antenna radiator and the first ground plane are on different planes, and the first planar inverted-F antenna radiator and the second ground plane are on different planes.

In an embodiment of the disclosure, the projection of the first planar inverted-F antenna radiator onto a plane of the second ground plane is outside the second ground plane.

In an embodiment of the disclosure, the antenna module further includes a second planar inverted-F antenna radiator including a second feeding terminal and a second ground terminal, and the second ground terminal is connected to the second ground plane.

In an embodiment of the disclosure, the projection of the second planar inverted-F antenna radiator onto a plane of the first ground plane is outside the first ground plane.

In an embodiment of the disclosure, the first planar inverted-F antenna radiator is an RFID antenna, and the second planar inverted-F antenna radiator is a WiFi antenna.

Based on the above, in the antenna module of the disclosure, the first ground terminal of the first planar inverted-F antenna radiator is connected to the first ground plane, the second ground plane is located on one side of the first ground plane, and the conductor is connected to the first ground plane and the second ground plane. The antenna module of the disclosure divides the ground plane into two parts that are connected through a conductor. Such design provides flexible space utilization that is suitable for application in small devices.

DESCRIPTION OF THE EMBODIMENTS

Figure 1:
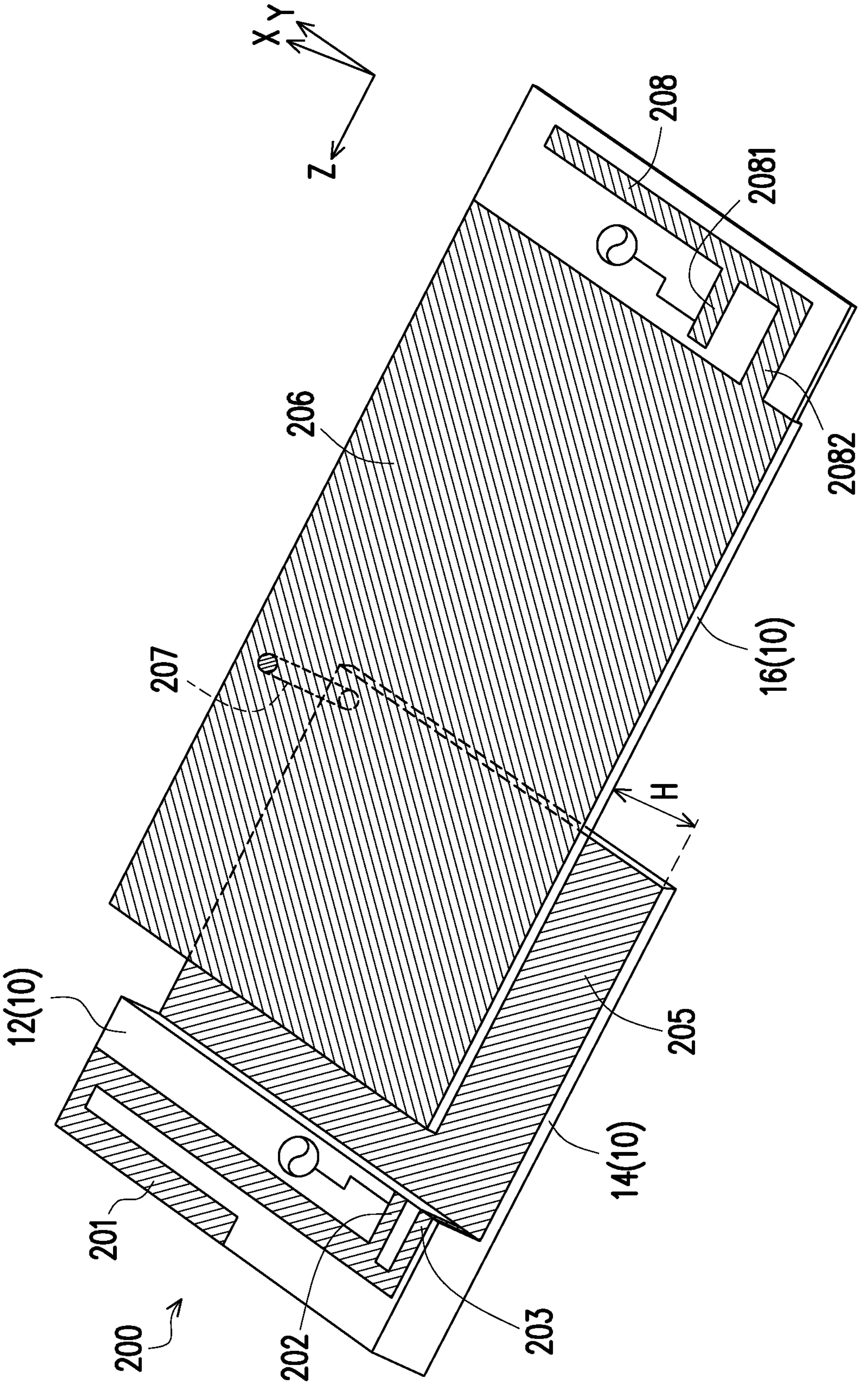
FIG. 1 is a schematic diagram of an antenna module according to an embodiment of the disclosure.

FIG. 1 is a schematic diagram of an antenna module according to an embodiment of the disclosure. In FIG. 1, the antenna module 200 of this embodiment includes a first planar inverted-F antenna radiator 201, a first ground plane 205, a second ground plane 206, and a conductor 207. In this embodiment, the first planar inverted-F antenna radiator 201 is an RFID antenna, but not limited thereto.

The first planar inverted-F antenna radiator 201 includes a first feeding terminal 202 and a first ground terminal 203. The first ground terminal 203 is connected to the first ground plane 205. The second ground plane 206 is located on one side of the first ground plane 205, and there is a gap H between the first ground plane 205 and the second ground plane 206. In this embodiment, the first ground plane 205 is parallel to the second ground plane 206, and the second ground plane 206 is above the first ground plane 205, so that the projection of the second ground plane 206 onto the plane where the first ground plane 205 is overlaps with at least part of the first ground plane 205.

Such design reduces the area of the ground plane on the YZ plane as marked in FIG. 1, and it is suitable for application in small-sized, wearable devices. In particular, the dimension in the Z-direction may be reduced to shorten the length of a product. In addition, electronic components may be placed on the first ground plane 205 and the second ground plane 206 to maximize space utilization.

Specifically, the antenna module 200 of this embodiment may be applied to handheld or wearable communication products. An LCD display module (LCM), a camera, a barcode-scanning lens module, a CPU, a speaker, a battery, an LTE radio frequency module, a WiFi radio frequency module, a Bluetooth module, a baseband circuit, or/and other components (not shown in FIG. 1) may be optionally disposed on the second ground plane 206. A battery may be disposed on the first ground plane 205, or/and an RFID circuit may be disposed on the first ground plane 205 to form an RFID module with the first planar inverted-F antenna, and the RFID module is connected to the second ground plane 206. The CPU may control the RFID circuit on the first ground plane 205 and the baseband circuit or the radio frequency circuit on the second ground plane 206.

Certainly, in other embodiments, types and configurations of the electronic components of the handheld or wearable communication product are not limited thereto. In addition, the first ground plane 205 and the second ground plane 206 may also be coplanar in other embodiments, and the relative positions of the first ground plane 205 and the second ground plane 206 are not limited thereto.

The first planar inverted-F antenna radiator 201 is located on a different plane from the first ground plane 205 and is located on a different plane from the second ground plane 206. As seen in FIG. 1, the antenna module 200 is disposed on a bracket 10, the first planar inverted-F antenna radiator 201 is disposed on the first surface 12 of the bracket 10, the first ground plane 205 is disposed on the second surface 14 of the bracket 10, and the second ground plane 206 is disposed on a third surface 16 of the bracket 10. Certainly, the relative positions may be adjusted for the antenna module 200, depending on the space allowed in the wearable device applied. The relative positions are not limited by the drawings.

The conductor 207 is located between the first ground plane 205 and the second ground plane 206 and connects the first ground plane 205 with the second ground plane 206. Specifically, the conductor 207 is located at the gap H.

The projection of the conductor 207 onto the plane where the first ground plane 205 is and the projection of the first planar inverted-F antenna radiator 201 onto the plane where the first ground plane 205 is are close to two sides of the first ground plane 205. Furthermore, in this embodiment, the projections of the conductor 207 and the first ground terminal 203 on the first ground plane 205 are close to two diagonal corners of the first ground plane 205.

The location of the conductor 207 affects the current direction on the first ground plane 205. It is tested and found that the current direction on the first ground plane 205 flows in the positive Y-direction or the negative Y-direction in this embodiment. The conventional RFID tag antenna (not shown) has a main current presented in the form of a hair clip in the Y-direction. In this embodiment, as the current on the first ground plane 205 flows in the positive or negative Y-direction, the maximum radiation pattern may be generated in the positive X or X-axis direction, which corresponds to the main current direction of the conventional RFID tag antenna, and thus the antenna module 200 is suitable for detection of conventional RFID tag antennas.

In addition, in this embodiment, the antenna module 200 may optionally include a second planar inverted-F antenna radiator 208, and the second planar inverted-F antenna radiator 208 is, for example, a Wi-Fi antenna. Certainly, in other embodiments, the second planar inverted-F antenna radiator 208 may not be necessary, depending on the practical requirement.

The second planar inverted-F antenna radiator 208 includes a second feeding terminal 2081 and a second ground terminal 2082, and the second ground terminal 2082 is connected to the second ground plane 206. In this embodiment, the second planar inverted-F antenna radiator 208 is also disposed on the third surface 16 of the bracket 10 to be coplanar with the second ground plane 206, but the position of the second planar inverted-F antenna radiator 208 is not limited thereto.

As shown in FIG. 1, the projection of the first planar inverted-F antenna radiator 201 onto the plane where the second ground plane 206 is outside the second ground plane 206, and the projection of the second planar inverted-F antenna radiator 208 onto the plane where the first ground plane 205 is outside the first ground plane 205. Such design ensures that the first planar inverted-F antenna radiator 201 and the second planar inverted-F antenna radiator 208 are not shielded and operate properly.

When the planar inverted-F antenna excites electromagnetic wave radiation to transmit signals, the current is fed from the feeding terminal to the planar inverted-F antenna and then flows from the ground terminal to the corresponding ground plane. Therefore, the shape of the radiation pattern of the planar inverted-F antenna is determined by the direction and the magnitude of the current of the planar inverted-F antenna and the ground plane.

The antenna module 200 of this embodiment employs the above characteristics to divide the ground plane into two (that is, the first ground plane 205 and the second ground plane 206), and a conductor 207 is provided between the first ground plane 205 and the second ground plane 206. The direction and the magnitude of the current of the first ground plane 205 and the second ground plane 206 can be controlled by adjusting the position of the conductor 207 to generate a radiation pattern suitable for RFID.

Figure 2:
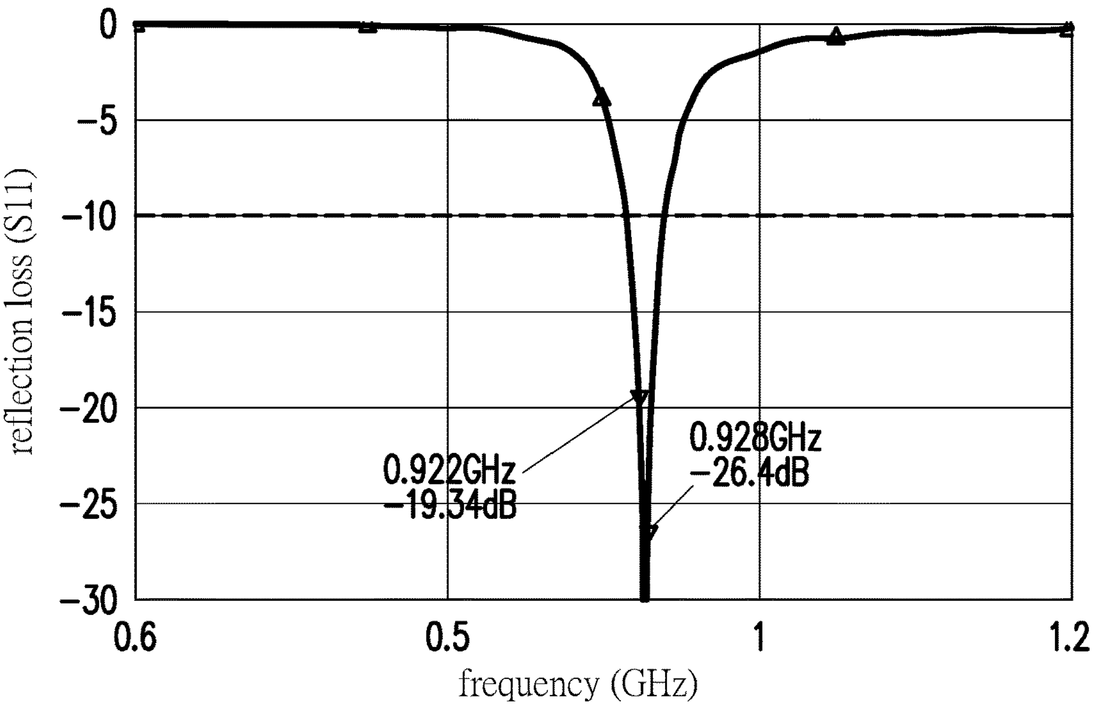
FIG. 2 is a diagram of the relationship between the frequency and the reflection loss of the antenna module in FIG. 1.

FIG. 2 is a diagram of the relationship between the frequency and the reflection loss of the antenna module of FIG. 1. In FIG. 2, the frequency band of the antenna module 200 in this embodiment covers the RFID operating frequency from 922 MHz to 928 MHz designated in Taiwan, and has good performance.

Figure 3A:
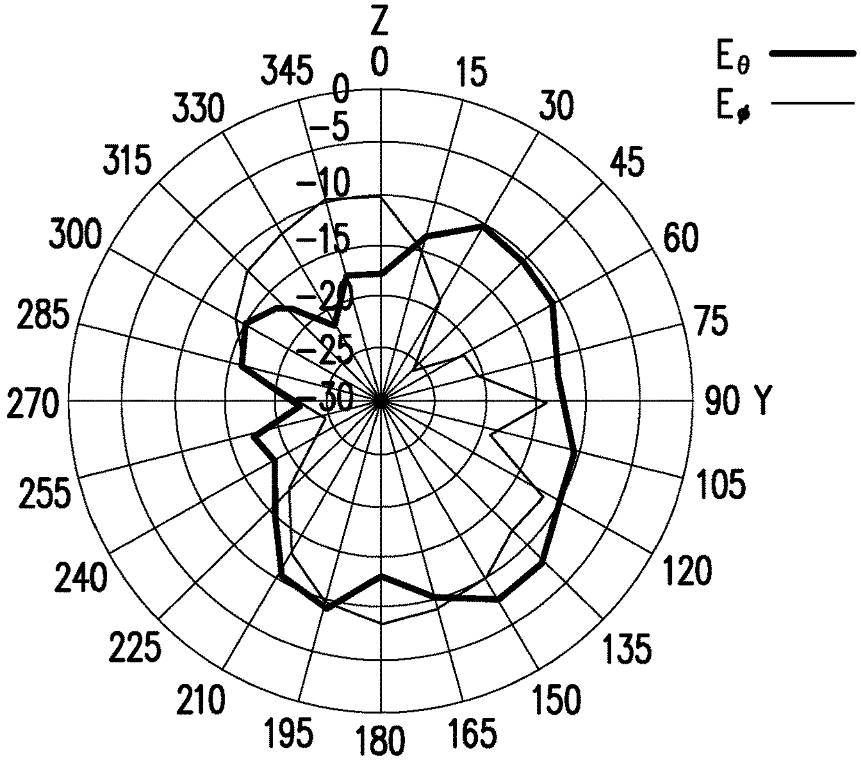
FIG. 3A to FIG. 3C are radiation patterns of the antenna module of FIG. 1 on different planes.
Figure 3B:
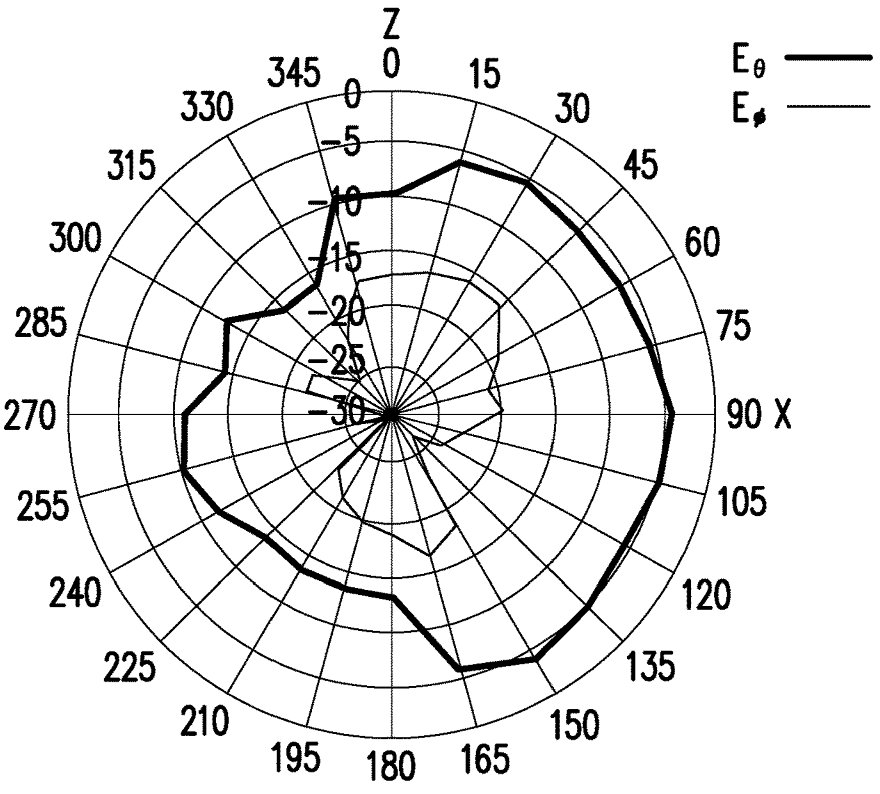
Figure 3C:
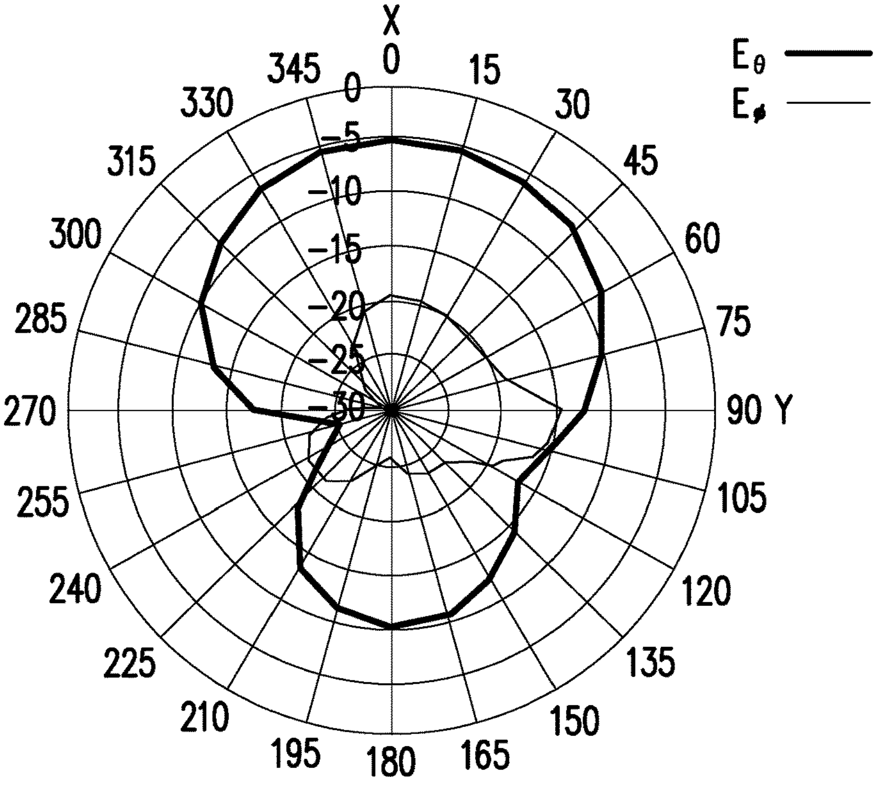

FIG. 3A to FIG. 3C are radiation patterns of the antenna module of FIG. 1 on different planes. FIG. 3A is a radiation pattern on the YZ-plane. FIG. 3B is a radiation pattern on the XZ-plane. FIG. 3A is a radiation pattern on the YX-plane. In addition, Eθ represents vertical polarization, and Eψ represents horizontal polarization.

In FIG. 3A to FIG. 3C, the antenna module 200 in this embodiment is disposed on a wearable device model for measurement, and the measurement result shows that the maximum radiation is the vertical polarization Eθ and is in the X-direction. If the antenna module 200 is disposed on a wearable device (such as a smart watch), and the X-direction is the direction toward the surface of the watch, such measurement result helps to detect the vertical polarization of the radiation pattern of the conventional RFID tag antenna.

Figure 4:
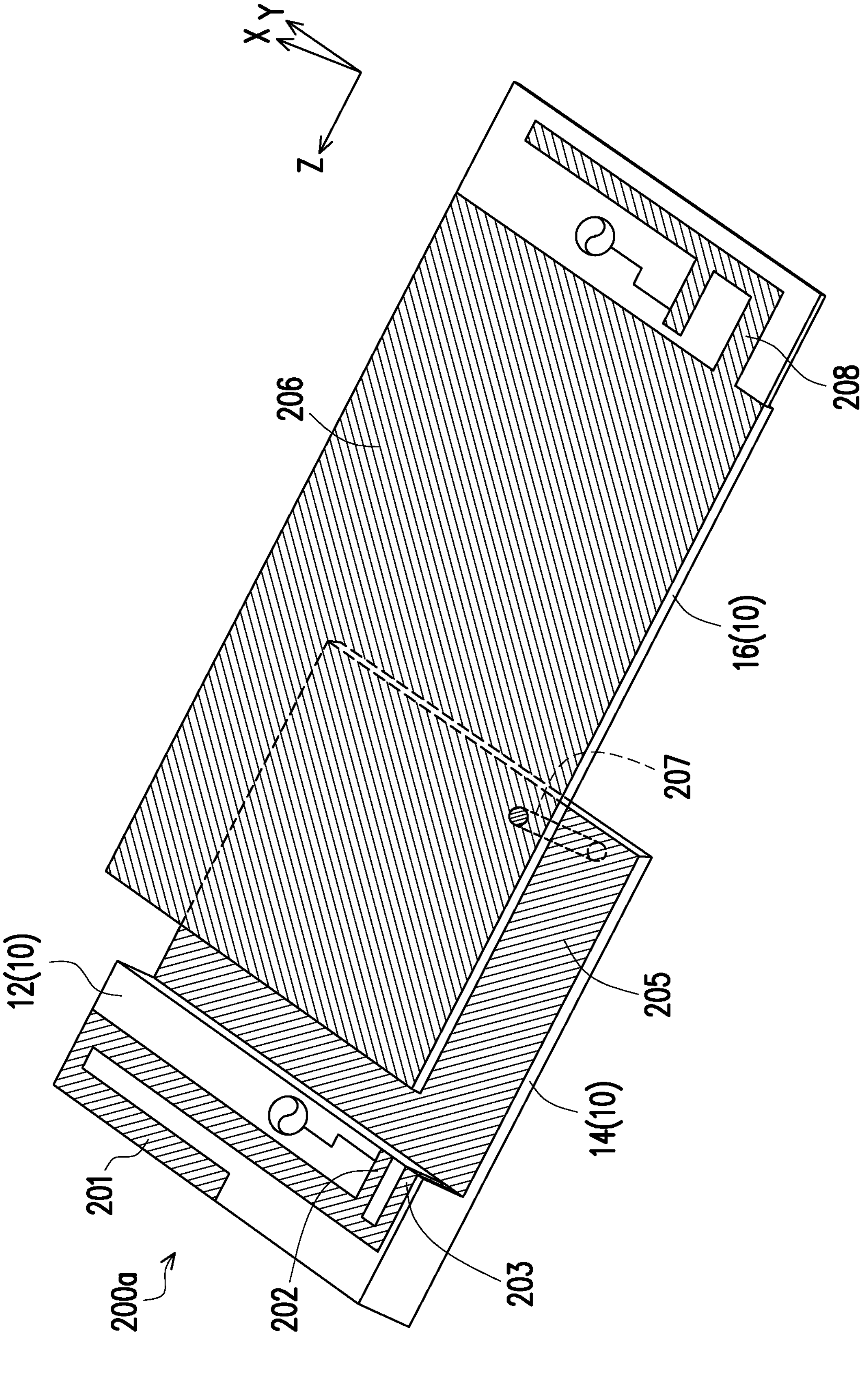
FIG. 4 is a schematic diagram of an antenna module according to another embodiment of the disclosure.

FIG. 4 is a schematic diagram of an antenna module according to another embodiment of the disclosure. The main difference between the antenna module 200*a* of FIG. 4 and the antenna module 200 of FIG. 1 is the position of the conductor 207. In FIG. 1, the conductor 207 is connected to the upper right corner of the first ground plane 205, and the first ground terminal 203 therein is connected to the lower left corner of the first ground plane 205. That is to say, the conductor 207 and the first ground terminal 203 are located at diagonal positions.

In this embodiment, the projections of the conductor 207 and the first ground terminal 203 on the first ground plane 205 are close to two adjacent corners of the first ground plane 205. Specifically, the conductor 207 is connected to the lower right corner of the first ground plane 205, and the first ground terminal 203 is connected to the lower left corner of the first ground plane 205. That is to say, the conductor 207 and the first ground terminal 203 are located at two adjacent corners in this embodiment.

It is tested and found that the current of the first ground plane 205 of the antenna module 200*a* of this embodiment flows in the Y-direction and the Z-direction, and the current direction on the first planar inverted-F antenna radiator 201 is the Y-direction. Overall, the antenna module 200*a* has two current directions, the Y direction and the Z direction. It also corresponds to the main current direction of the conventional RFID tag antenna, such that the antenna module 200*a* is suitable for detection of the conventional RFID tag antenna.

Figure 5A:
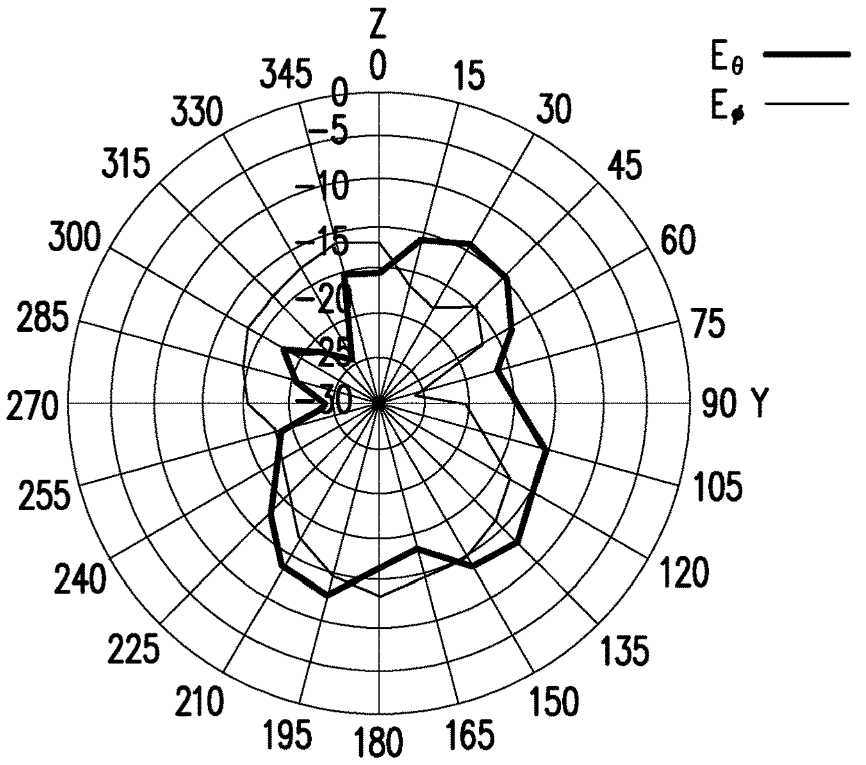
FIG. 5A to FIG. 5C are radiation patterns of the antenna module of FIG. 4 on different planes.
Figure 5B:
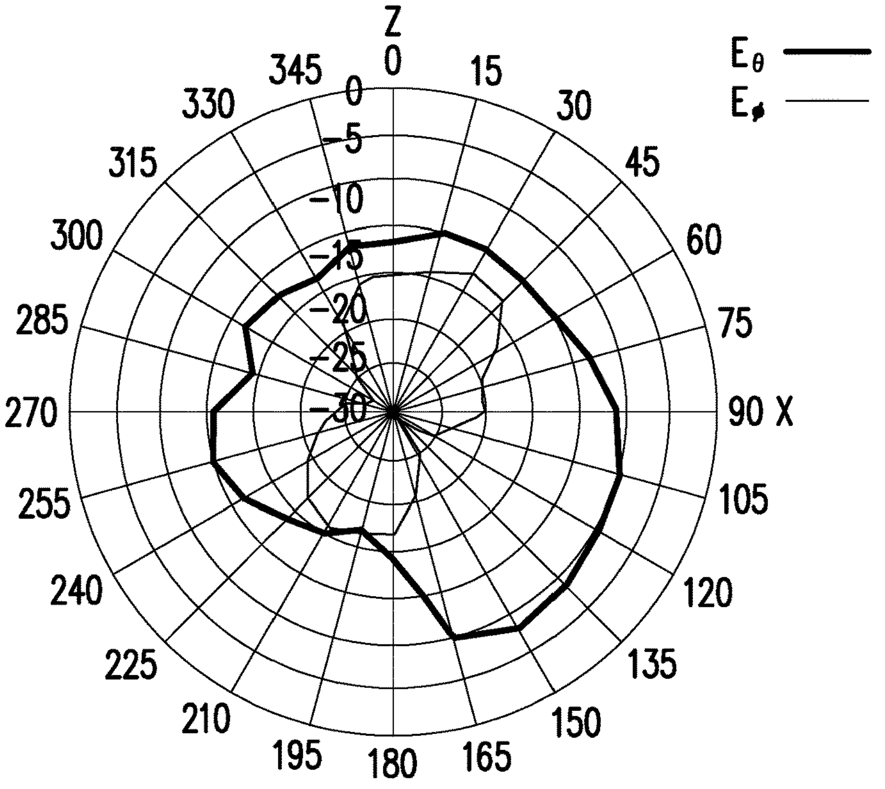
Figure 5C:
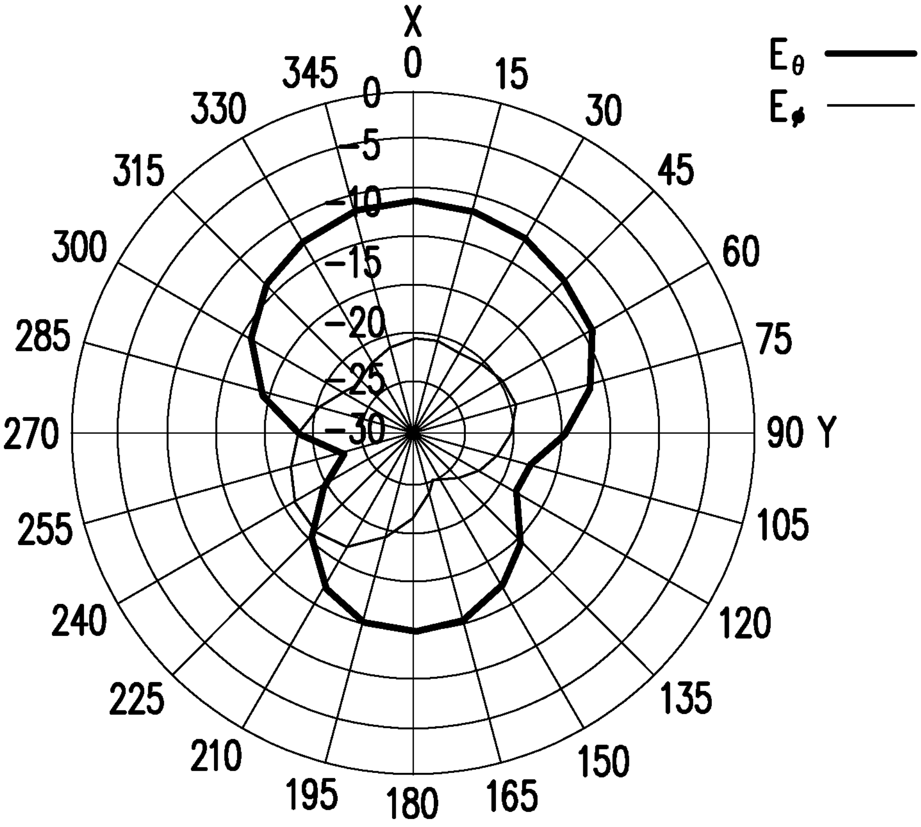

FIG. 5A to FIG. 5C are radiation patterns of the antenna module of FIG. 4 on different planes. As shown from the measurement results in FIG. 5A to FIG. 5C, the polarization of the maximum radiation of the antenna module 200*a* is vertical in the X-direction. As shown in FIG. 5B, the radiation pattern at angles from 90° to 16° is quite good. And as shown in FIG. 5C, the radiation pattern at the angles from 60° to 0° to 300° is quite good.

In addition, as shown in FIG. 3A to FIG. 3C and FIG. 5A to FIG. 5C, an adjustment of the position of the conductor 207 may change the current direction on the first ground plane 205, which further changes the radiation directions, and achieves different performance.

To sum up, in the antenna module of the disclosure, the first ground terminal of the first planar inverted-F antenna radiator is connected to the first ground plane, the second ground plane is located on one side of the first ground plane, and the conductor is connected to the first ground plane and the second ground plane. The antenna module of the disclosure divides the ground plane into two parts that are connected through a conductor. Such design provides flexible space utilization that is suitable for application in small devices.

What is claimed is:

1. An antenna module, comprising:

a first planar inverted-F antenna radiator, comprising a first feeding terminal and a first ground terminal;

a first ground plane, comprising the first ground terminal connected to the first ground plane;

a second ground plane, located on one side of the first ground plane, wherein a gap exists between the first ground plane and the second ground plane, and the second ground plane is not located between the first planar inverted-F antenna radiator and the first ground plane;

a conductor, located between the first ground plane and the second ground plane and connecting the first ground plane with the second ground plane; and a second planar inverted-F antenna radiator comprising a second feeding terminal and a second ground terminal, wherein the second ground terminal is connected to the second ground plane.

2. The antenna module of claim 1, wherein a projection of the second ground plane onto the first ground plane overlaps with at least part of the first ground plane, and the conductor is located in the gap.

3. The antenna module of claim 2, wherein a projection of the conductor onto the first ground plane and a projection of the first planar inverted-F antenna radiator onto the first ground plane are close to two sides of the first ground plane.

4. The antenna module of claim 2, wherein projections of the conductor and the first ground terminal onto the first ground plane are close to two diagonal corners of the first ground plane.

5. The antenna module of claim 2, wherein projections of the conductor and the first ground terminal onto the first ground plane are close to two adjacent corners of the first ground plane.

6. The antenna module of claim 1, wherein the first planar inverted-F antenna radiator and the first ground plane are on different planes, and the first planar inverted-F antenna radiator and the second ground plane are on different planes.

7. The antenna module of claim 1, wherein a projection of the first planar inverted-F antenna radiator onto a plane of the second ground plane is located outside the second ground plane.

8. The antenna module of claim 1, wherein a projection of the second planar inverted-F antenna radiator onto a plane of the first ground plane is outside the first ground plane.

9. The antenna module of claim 1, wherein the first planar inverted-F antenna radiator is an RFID antenna, and the second planar inverted-F antenna radiator is a Wi-Fi antenna.

* * * * *